United States Patent
Brunel et al.

(10) Patent No.: US 7,936,834 B2
(45) Date of Patent: May 3, 2011

(54) METHOD FOR TRANSFERRING DATA FROM A FIRST TELECOMMUNICATION DEVICE TO A SECOND TELECOMMUNICATION DEVICE

(75) Inventors: Loic Brunel, Rennes Cedex (FR); David Mottier, Rennes Cedex (FR)

(73) Assignee: Mitsubishi Electric Corporation, Tokyo (JP)

( * ) Notice: Subject to any disclaimer, the term of this patent is extended or adjusted under 35 U.S.C. 154(b) by 1000 days.

(21) Appl. No.: 11/758,930

(22) Filed: Jun. 6, 2007

(65) Prior Publication Data
US 2007/0286299 A1 Dec. 13, 2007

(30) Foreign Application Priority Data
Jun. 7, 2006 (EP) .................... 06290942

(51) Int. Cl.
*H04K 1/10* (2006.01)
*H04J 11/00* (2006.01)
(52) U.S. Cl. ........................... 375/260; 370/208
(58) Field of Classification Search .............. 375/219, 375/220, 222, 260, 262, 265, 340, 341; 370/208, 370/210, 337, 347, 442
See application file for complete search history.

(56) References Cited

U.S. PATENT DOCUMENTS

| | | | |
|---|---|---|---|
| 7,590,183 B2 * | 9/2009 | Yonge et al. | 375/260 |
| 2003/0179776 A1 | 9/2003 | Sumasu et al. | |
| 2004/0131007 A1 * | 7/2004 | Smee et al. | 370/208 |
| 2005/0174931 A1 * | 8/2005 | Krishnamoorthi | 370/208 |
| 2005/0180313 A1 * | 8/2005 | Kim et al. | 370/208 |
| 2006/0262870 A1 * | 11/2006 | Khan | 375/260 |

OTHER PUBLICATIONS

Anuj Batra, et al. "Physical Layer Submission to 802.15 Task Group 3a: Time-Frequency Interleaved Orthogonal Frequency Division Multiplexing (TFI-OFDM)", XP-002407818, May 5, 2003.
Hassan Yaghoobi, "Scalable OFDMA Physical Layer in IEEE 802.16 Wirelessman", Intel Technology Journal, XP-002407819, vol. 8, No. 3, Aug. 20, 2004, pp. 201-212.
"Physical Layer Aspects for Evolved Utra TR 25.0814", $3^{RD}$ Generation Partnership Project, XP-002408008, May 1, 2006, pp. 20-42.

* cited by examiner

*Primary Examiner* — Young T. Tse
(74) *Attorney, Agent, or Firm* — Oblon, Spivak, McClelland, Maier & Neustadt, L.L.P.

(57) ABSTRACT

The present invention concerns a method and a device for transferring, by a first telecommunication device, data to a second telecommunication device through a telecommunication network using multiple carrier frequencies. The first telecommunication device maps the data on first carrier frequencies of plural consecutive groups of first carrier frequencies, where each group of first carrier frequencies is spaced from the next group of first carrier frequencies by a second carrier frequency and at least two second carrier frequencies are carrier frequencies which are susceptible to be the demodulation carrier frequency of the second telecommunication device. The first telecommunication device also transfers the mapped data to the second telecommunication device.

28 Claims, 7 Drawing Sheets

METHOD FOR TRANSFERRING DATA FROM A FIRST TELECOMMUNICATION DEVICE TO A SECOND TELECOMMUNICATION DEVICE

BACKGROUND OF THE INVENTION

The present invention relates generally to telecommunication systems and in particular, to methods and devices for transferring data from a first telecommunication device to a second telecommunication device and/or for retrieving data.

In classical telecommunication networks, like wireless telecommunication networks, a base station transfers and/or receives data to and/or from user equipments.

In some wireless telecommunication networks, the overall system bandwidth is partitioned into plural carrier frequencies on which orthogonal signals are mapped.

The base station and the user equipments are able to transfer data through a same frequency band. Thus, the base station and the user equipments use the same modulation and/or demodulation carrier frequency and the frequency bands have the same bandwidth.

Recently, some wireless telecommunication networks allow the base station to transfer and/or receive data in a frequency band which has a larger bandwidth than the one used by some user equipments.

Such technique enables the user equipments which have different capabilities in term of bandwidth to communicate with the base station.

The problem with such technique is that the overall frequency band of the base station may not be used efficiently.

In order to use more efficiently the overall frequency band of the base station, the user equipments should be able to have different modulation and/or demodulation carrier frequencies.

The existence of different modulation and/or demodulation carrier frequencies generates some problems. If the base station maps data on the demodulation carrier frequency of a user equipment, the data may be, after demodulation by the user equipment, mixed with continuous components depending on the user equipment architecture. Strong interferences may arise from these continuous components, so that data, received in this demodulation carrier frequency are very unreliable.

Similarly, if a user equipment maps the data on the demodulation carrier frequency of the base station, the data may be, after demodulation by the base station, mixed with continuous components depending on the base station architecture. Strong interferences may arise from these continuous components, so that data, received in this demodulation carrier frequency are very unreliable.

SUMMARY OF THE INVENTION

The aim of the invention is therefore to propose methods and devices which allow the user equipments and the base station to have different modulation and/or demodulation carrier frequencies without having strongly interfered data on these carrier frequencies.

To that end, the present invention concerns a method for transferring, by a first telecommunication device, data to a second telecommunication device through a telecommunication network using multiple carrier frequencies, characterised in that the method comprises the steps executed by the first telecommunication device, of:

mapping the data on first carrier frequencies of plural consecutive groups of first carrier frequencies, each group of first carrier frequencies being spaced from the next group of first carrier frequencies by a second carrier frequency, at least two second carrier frequencies being carrier frequencies which are susceptible to be the demodulation carrier frequency of the second telecommunication device, transferring the mapped data to the second telecommunication device.

The present invention concerns also a device for transferring, from a first telecommunication device, data to a second telecommunication device, through a telecommunication network using multiple carrier frequencies, characterised in that the device for transferring is included in the first telecommunication device and comprises:

means for mapping the data on first carrier frequencies of plural consecutive groups of first carrier frequencies, each group of first carrier frequencies being spaced from the next group of first carrier frequencies by a second carrier frequency, at least two second carrier frequencies being carrier frequencies which are susceptible to be the demodulation carrier frequency of the second telecommunication device, means for transferring the mapped data to the second telecommunication device.

Thus, the second telecommunication device is able to have different demodulation carrier frequencies without having strongly interfered data on these carrier frequencies.

According to a particular feature, each second carrier frequency which is susceptible to be the demodulation carrier frequency of the second telecommunication device is a predetermined carrier frequency.

Thus, by having predetermined second carrier frequencies, the determination of the second carrier frequencies is very simple. The first telecommunication device knows a priori which carrier frequencies are susceptible to be the demodulation carrier frequency of the second telecommunication device.

According to a particular feature, each group of first carrier frequencies comprises the same predetermined number of first carrier frequencies.

Thus, the mapping of the data on the first carrier frequencies is simplified. The complexity of the first telecommunication device is then reduced.

According to a particular feature, the data are transferred under the form of first symbols of a first duration and second symbols of a second duration, the first symbols being mapped on a first number of first carrier frequencies, the second symbols being mapped on a second number of first carrier frequencies.

According to a particular feature, each first carrier frequency on which a first symbol is mapped is spaced from the second carrier frequencies by an integer number of $\Delta f$, where $\Delta f$ is the spacing between two first carrier frequencies on which a first symbol is mapped.

Thus, the second telecommunication device doesn't retrieve strongly interfered data on a carrier frequency.

According to a particular feature, each first carrier frequency on which a second symbol is mapped is spaced from the second carrier frequencies by an integer number of $L\Delta f$, where L is the first duration divided by the second duration.

Thus, the first symbols and the second symbols are not mapped on the second carriers frequencies. It is then, not necessary to have specific second carrier frequencies on which first symbols are not mapped and other second carrier frequencies on which second symbols are not mapped.

The second telecommunication device doesn't retrieve strongly interfered data on a carrier frequency.

According to a particular feature, the number $X_L$ of first carrier frequencies on which first symbols are mapped in one group of first carrier frequencies and the number $X_S$ of first carrier frequencies on which second symbols are mapped in that group of first carrier frequencies satisfy the following formula $(X_L+1)=(X_S+1)L$.

Thus, by controlling the number of first carrier frequencies on which first symbols are mapped in one group of first carrier frequencies and the number of first carrier frequencies on which second symbols are mapped in that group of first carrier frequencies, the second telecommunication device doesn't retrieve strongly interfered data on a carrier frequency.

According to a particular feature, at least one other second carrier frequency is a predetermined carrier frequency defined in order to insure that in each group of first carrier frequencies, the number $X_L$ of first carrier frequencies on which first symbols are mapped in one group of first carrier frequencies and the number $X_S$ of first carrier frequencies on which second symbols are mapped in that group of first carrier frequencies satisfy the formula $(X_L+1)=(X_S+1)L$.

Thus, the mapping of the data on the first carrier frequencies is simplified. The complexity of the first telecommunication device is then reduced.

Furthermore, the groups of first carrier frequencies are regularly spaced on the overall frequency band of the first or second telecommunication devices.

According to a particular feature, the first telecommunication device transfers data through a first frequency band, the second telecommunication device receives data through a second frequency band and the bandwidth of the second frequency band is smaller than the bandwidth of the first frequency band.

According to a particular feature, the first telecommunication device transfers data to plural second telecommunication devices and at least one second carrier frequency is a carrier frequency which is susceptible to be the demodulation carrier frequency of another second telecommunication device.

Thus, the mapping of the data on the first carrier frequencies is simplified. The complexity of the first telecommunication device is then reduced.

Furthermore, by mapping the data only on the first carrier frequencies and not on the carrier frequency which is susceptible to be the demodulation carrier frequency of another second telecommunication device, the first telecommunication device maps data among the same first carrier frequencies for each second telecommunication device. The second telecommunication device retrieves data among the same first carrier frequencies without having to consider which carrier frequency is its demodulation carrier frequency.

According to a particular feature, the first telecommunication device transfers data through a first frequency band and the second telecommunication device receives data through a second frequency band and the bandwidth of the first frequency band is smaller than the bandwidth of the second frequency band.

According to a particular feature, one second carrier frequency is the modulation carrier frequency of the first telecommunication device.

Thus, the second telecommunication device will not be disturbed by strong interferences which may arise from the continuous components which may appear on the modulation frequency of the first telecommunication device.

According to a particular feature, at least one other second carrier frequency is the carrier frequency which is susceptible to be the modulation carrier frequency of another first telecommunication device.

Thus, by mapping the data only on the first carrier frequencies and not on the carrier frequency which is susceptible to be the modulation carrier frequency of another first telecommunication device, the second telecommunication device doesn't have to consider which first telecommunication device transfers the data in order to retrieve the data on first carrier frequencies.

Furthermore, the groups of first carrier frequencies are regularly spaced on the overall frequency band of the first or second telecommunication devices.

According to a particular feature, the first telecommunication device maps on the second carrier frequencies null value or pilot symbols or other data than the one mapped on the first carrier frequencies.

Thus, if the first telecommunication device maps null value on the second carrier frequencies, the mapping of the data on the second carrier frequencies is simplified. If the first telecommunication device maps on the second carrier frequencies pilot symbols or other data than the one mapped on the first carrier frequencies, the frequency band is used efficiently.

According to still another aspect, the present invention concerns a method for retrieving data transferred by a first telecommunication device to a second telecommunication device through a telecommunication network using multiple carrier frequencies, characterised in that the method comprises the steps executed by the second telecommunication device, of:
selecting first carrier frequencies of at plural consecutive groups of first carrier frequencies, each group of first carrier frequencies being spaced from the next group of first carrier frequencies by a second carrier frequency, at least two second carrier frequencies being carrier frequencies which are susceptible to be the demodulation carrier frequency of the second telecommunication device,
retrieving data on the selected first carrier frequencies.

The present invention concerns also a device for retrieving data transferred by a first telecommunication device to a second telecommunication device through a telecommunication network using multiple carrier frequencies, characterised in that the device for retrieving is included in the second telecommunication device and comprises:
means for selecting first carrier frequencies of at plural consecutive groups of first carrier frequencies, each group of first carrier frequencies being spaced from the next group of first carrier frequencies by a second carrier frequency, at least two second carrier frequencies being carrier frequencies which are susceptible to be the demodulation carrier frequency of the second telecommunication device,
means for retrieving data on the selected first carrier frequencies.

Thus, the second telecommunication devices are able to have different demodulation carrier frequencies from the modulation carrier frequency of the first telecommunication device without having strongly interfered data on these carrier frequencies.

According to a particular feature, each group of first carrier frequencies comprises the same predetermined number of first carrier frequencies.

Thus, the retrieving of the data on the first carrier frequencies is simplified.

According to a particular feature, each first carrier frequency on which a first symbol is mapped is spaced from the second carrier frequencies by an integer number of $\Delta f$, where Δf is the spacing between two first carrier frequencies on which a first symbol is mapped.

According to a particular feature, each first carrier frequency on which a second symbol is mapped is spaced from the second carrier frequencies by an integer number of LΔf, where L is the first duration divided by the second duration.

Thus, the first symbols and the second symbols are not mapped on the second carriers frequencies. It is then, not necessary to have specific second carrier frequencies on which first symbols are not mapped and other second carrier frequencies on which second symbols are not mapped.

According to a particular feature, the number $X_L$ of first carrier frequencies on which first symbols are mapped in one group of first carrier frequencies and the number $X_S$ of first carrier frequencies on which second symbols are mapped in that group of first carrier frequencies satisfy the following formula $(X_L+1)=(X_S+1)L$, wherein L is the first duration divided by the second duration.

According to a particular feature, at least one other second carrier frequency is a predetermined carrier frequency defined in order to insure that in each group of first carrier frequencies, the number $X_L$ of first carrier frequencies on which first symbols are mapped in one group of first carrier frequencies and the number $X_S$ of first carrier frequencies on which second symbols are mapped in that group of first carrier frequencies satisfy the formula $(X_L+1)=(X_S+1)L$ or at least one other second carrier frequency is the carrier frequency which is susceptible to be the demodulation carrier frequency of another second telecommunication device or at least one other second carrier frequency is the carrier frequency which is susceptible to be the modulation carrier frequency of another first telecommunication device.

Thus, the selection of the data on the first carrier frequencies is simplified. The complexity of the second telecommunication device is then reduced.

Furthermore, by selecting the data only on the first carrier frequencies and not on the carrier frequency which is susceptible to be the modulation carrier frequency of another second telecommunication device, all the second telecommunication devices select the same first carrier frequencies.

Furthermore, by selecting the data only on the first carrier frequencies and not on the carrier frequency which is susceptible to be the demodulation carrier frequency of another first telecommunication device, all the second telecommunication devices select the same first carrier frequencies. The second telecommunication device retrieves data on the same first carrier frequencies without having to consider which carrier frequency is the modulation carrier frequency of the first telecommunication device which transfers data.

According to a particular feature, the second telecommunication device selects at least one second carrier frequency and/or at least one other second carrier frequency and retrieves data on the selected second carrier frequency and/or on the at least one other second carrier frequency.

Thus, the frequency band is used efficiently.

According to a particular feature, the first telecommunication device transfers data through a downlink channel and the second telecommunication device transfers data through an uplink channel and the uplink and downlink channels have the same second carrier frequencies.

The complexity of the telecommunication devices is then reduced.

According to still another aspect, the present invention concerns computer programs which can be directly loadable into a programmable device, comprising instructions or portions of code for implementing the steps of the methods according to the invention, when said computer programs are executed on programmable devices.

Since the features and advantages relating to the computers programs are the same as those set out above representative of the methods and devices according to the invention, they will not be repeated here.

According to still another aspect, the present invention concerns a signal transferred by a first telecommunication device to a second telecommunication device, the signal being transferred through a frequency band composed of multiple carrier frequencies, characterised in that data are mapped on first carrier frequencies of plural consecutive groups of first carrier frequencies and in that each group of first carrier frequencies is spaced from the next group of first carrier frequencies by a second carrier frequency, at least two second carrier frequencies being carrier frequencies which are susceptible to be the demodulation carrier frequency of the second telecommunication device.

According to a particular feature, each group of first carrier frequencies comprises the same predetermined number of first carrier frequencies.

According to a particular feature, the data are under the form of first symbols of a first duration and second symbols of a second duration, the first symbols being mapped on a first number of first carrier frequencies, the second symbols being mapped on a second number of first carrier frequencies.

According to a particular feature, each first carrier frequency on which a first symbol is mapped is spaced from the second carrier frequencies by an integer number of Δf, where Δf is the spacing between two first carrier frequencies on which a first symbol is mapped.

According to a particular feature, each first carrier frequency on which a second symbol is mapped is spaced from the second carrier frequencies by an integer number of LΔf, where Δf is the spacing between two first carrier frequencies on which a first symbol is mapped and L is the first duration divided by the second duration.

According to a particular feature, the number $X_L$ of first carrier frequencies on which first symbols are mapped in one group of first carrier frequencies and the number $X_S$ of first carrier frequencies on which second symbols are mapped in that group of first carrier frequencies satisfy the following formula $(X_L+1)=(X_S+1)L$.

According to a particular feature, the number $X_L$ of first carrier frequencies on which first symbols are mapped in one group of first carrier frequencies is equal to 75, the number $X_S$ of first carrier frequencies on which second symbols are mapped in that group of first carrier frequencies is equal to 37, L equals two and each group of first carrier frequencies is divided into three resource blocks.

According to a particular feature, the number $X_L$ of first carrier frequencies on which first symbols are mapped in one group of first carrier frequencies is equal to 147, the number $X_S$ of first carrier frequencies on which second symbols are mapped in that group of first carrier frequencies is equal to 73, L equals two and each group of first carrier frequencies is divided into seven resource blocks.

According to a particular feature, the number $X_L$ of first carrier frequencies on which first symbols are mapped in one group of first carrier frequencies is equal to 135, the number $X_S$ of first carrier frequencies on which second symbols are mapped in that group of first carrier frequencies is equal to 67 and L equals two and each group of first carrier frequencies is divided into five resource blocks.

According to a particular feature, the number $X_L$ of first carrier frequencies on which first symbols are mapped in one group of first carrier frequencies is equal to 77, the number $X_S$ of first carrier frequencies on which second symbols are mapped in that group of first carrier frequencies is equal to 38, L equals two and each group of first carrier frequencies is divided into seven resource blocks.

Since the features and advantages relating to the signals are the same as those set out above related to the methods and devices according to the invention, they will not be repeated here.

BRIEF DESCRIPTION OF THE DRAWINGS

The characteristics of the invention will emerge more clearly from a reading of the following description of an example embodiment, the said description being produced with reference to the accompanying drawings, among which.

DETAILED DESCRIPTION

Figure 1:
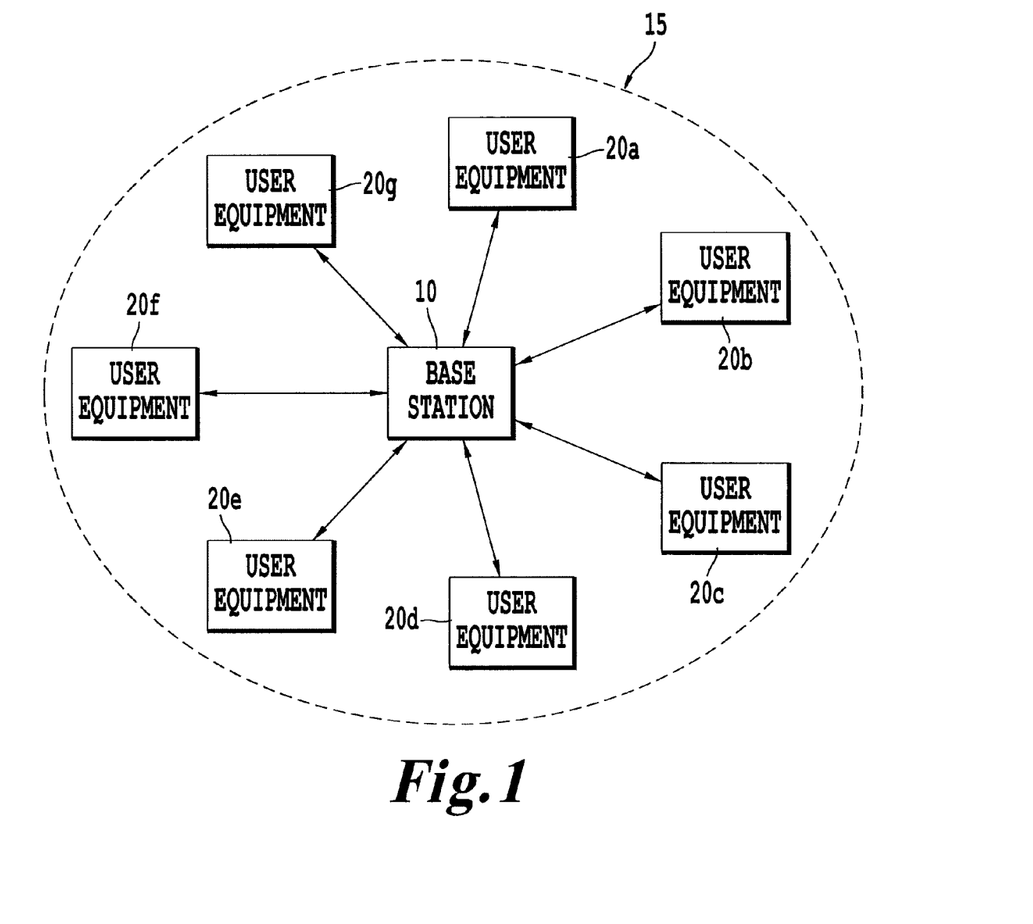
FIG. 1 is a diagram representing the architecture of a wireless telecommunication network in which the present invention is implemented.

FIG. 1 is a diagram representing the architecture of a telecommunication network in which the present invention is implemented.

In the telecommunication network 15, a base station 10 transfers and/or receives data to and/or from user equipments 20a to 20g.

The telecommunication network 15 is either a wireless telecommunication network or a wired telecommunication network which uses, for instance, electric power line distribution network as a medium of transmission.

In the telecommunication network 15, the overall system bandwidth is partitioned into plural carrier frequencies on which orthogonal signals are mapped. Some of the carrier frequencies are grouped into resource blocks which are comprised into groups of carrier frequencies according to the present invention.

As example and in a non limitative way, the wireless telecommunication network 15 uses an Orthogonal Frequency Division Multiple Access scheme.

In the FIG. 1, only seven user equipments 20a to 20g are shown for the sake of clarity but we can understand that a reduced number of user equipments 20 or a more important number of user equipments 20 can be used in the present telecommunication network 15.

The base station 10 is a telecommunication device which is also named a node B or an enhanced node B.

The user equipment devices 20 are, as example and in a non limitative way, telecommunication devices like mobile phones, personal digital assistants, personal computers.

Each user equipment 20a to 20g is linked to the base station 10 using an uplink and a downlink channel.

The base station 10 transfers data to the user equipments 20 through the downlink channel and each user equipment 20a to 20g transfers data to the base station 10 through the uplink channel.

The base station 10 is able to transfer and/or receive data through a frequency band which has a bandwidth which is larger than or equal to the bandwidth of frequency band in which the user equipments 20a to 20g are able to transfer and/or receive data.

As example and in a non limitative way, the base station 10 is able to transfer and/or receive data through a first frequency band which has a bandwidth equal to 20 MHz and the user equipments 20a to 20g are able to receive and/or transfer data through a second frequency band which has a bandwidth equal to 10 MHz or 15 MHz or 20 MHz.

It has to be noted here that, the bandwidth of second frequency band may be different from each user equipment 20a to 20g.

The base station 10 has a modulation and/or demodulation carrier frequency which is the carrier frequency which is at the centre of the first frequency band of the base station 10 or is a carrier frequency which is around the centre of the first frequency band of the base station 10.

The present invention will be describe when Time Division Duplexing scheme is used in the telecommunication network 15, i.e. when the modulation and the demodulation carrier frequencies of the base station 10 are identical. The present invention is also applicable when Frequency Division Duplexing scheme is used in the telecommunication network 15, i.e. when the modulation and the demodulation carrier frequencies of the base station 10 are different.

Each user equipment 20a to 20g has a modulation and/or demodulation carrier frequency which is the carrier frequency which is at the centre of the second frequency band of the user equipment 20a to 20g or is a carrier frequency which is around the centre of the second frequency band of the user equipment 20a to 20g.

The modulation carrier frequency of each equipment 20a to 20g is equal to its demodulation carrier frequency but we can understand, as it has already been disclosed, that the modulation carrier frequency of each equipment 20a to 20g can be also different from its demodulation carrier frequency.

The modulation and/or demodulation carrier frequency of each user equipment 20a to 20g may be different from the demodulation and/or modulation carrier frequency of the base station 10.

The modulation and/or demodulation carrier frequency of each user equipment 20a to 20g may be different from the demodulation and/or modulation carrier frequency of other user equipments 20a to 20g.

The user equipments 20 are allowed to have a camping position, i.e., a modulation and/or demodulation carrier frequency which is different from the demodulation and/or modulation carrier frequency of the base station 10. Compared to the simplistic configuration in which the modulation and/or demodulation carrier frequencies of the user equipments 20 are always identical to the demodulation and/or modulation carrier frequency of the base station 10, the possibility to have different camping positions enables a better usage of the frequency bands.

When a base station 10 and a user equipment 20 have different modulation and/or demodulation carrier frequencies, if the base station 10 maps data on the demodulation carrier frequency of the user equipment 20, the data may be, after demodulation by the user equipment 20, mixed with continuous components of the electrical environment depending on the user equipment 20 architecture. Strong interferences may arise from these continuous components, so that data received in this carrier frequency may be strongly interfered. The same problems arise also in the uplink channel i.e. when the user equipments 20 map data on the demodulation carrier frequency of the base station 10.

Figure 2:
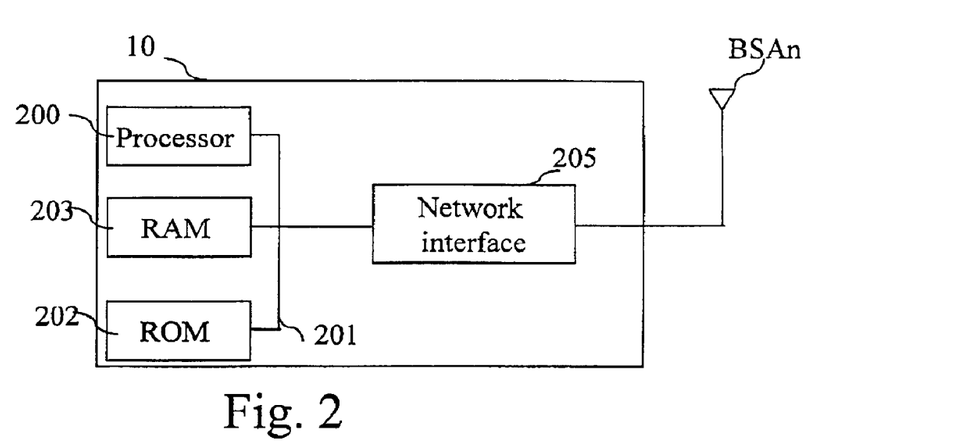
FIG. 2 is a diagram representing the architecture of a base station.

FIG. 2 is a diagram representing the architecture of a base station.

Figure 8:
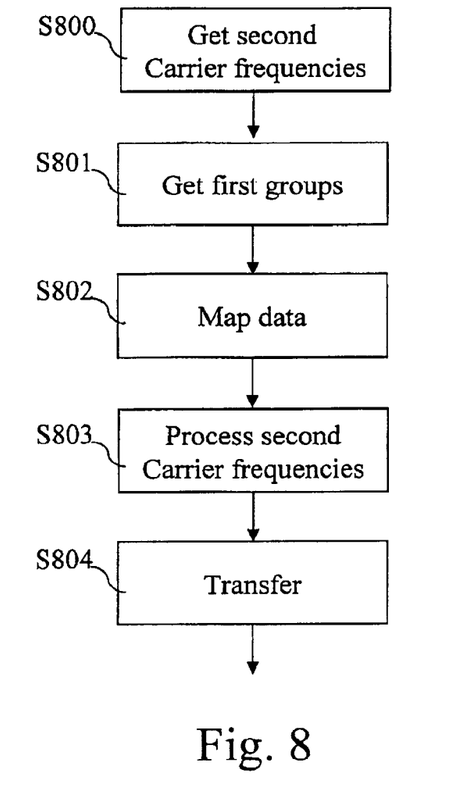
FIG. 8 is a diagram representing an algorithm for transferring data according to the present invention.
Figure 9:
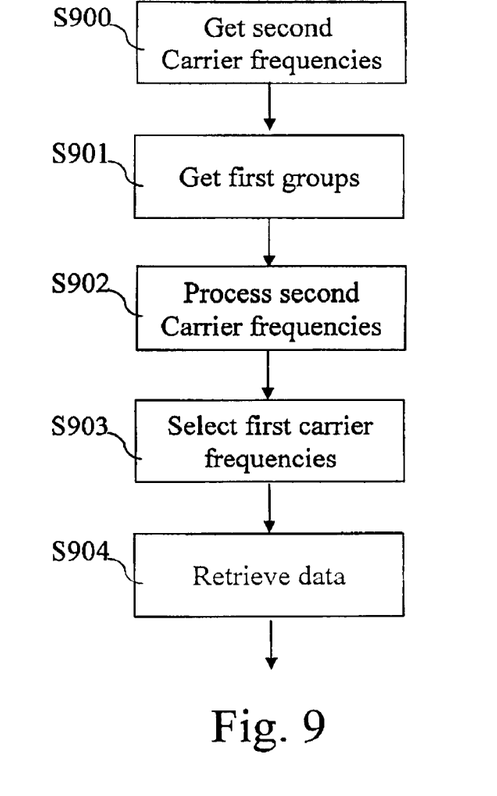
FIG. 9 is a diagram representing an algorithm for retrieving data according to the present invention.

The base station 10, has, for example, an architecture based on components connected together by a bus 201 and a processor 200 controlled by programs as disclosed in the FIGS. 8 and 9.

It has to be noted here that the base station 10 is, in a variant, implemented into one or several dedicated integrated circuits which execute the same operations as the one executed by the processor 200 as disclosed hereinafter.

The bus 201 links the processor 200 to a read only memory ROM 202, a random access memory RAM 203 and a network interface 205.

The read only memory ROM 202 contains instructions of the programs related to the algorithms as disclosed in the FIGS. 8 and 9 which are transferred, when the base station 10 is powered on to the random access memory RAM 203.

The RAM memory 203 contains registers intended to receive variables, and the instructions of the programs related to the algorithms as disclosed in the FIGS. 8 and 9.

Figure 3:
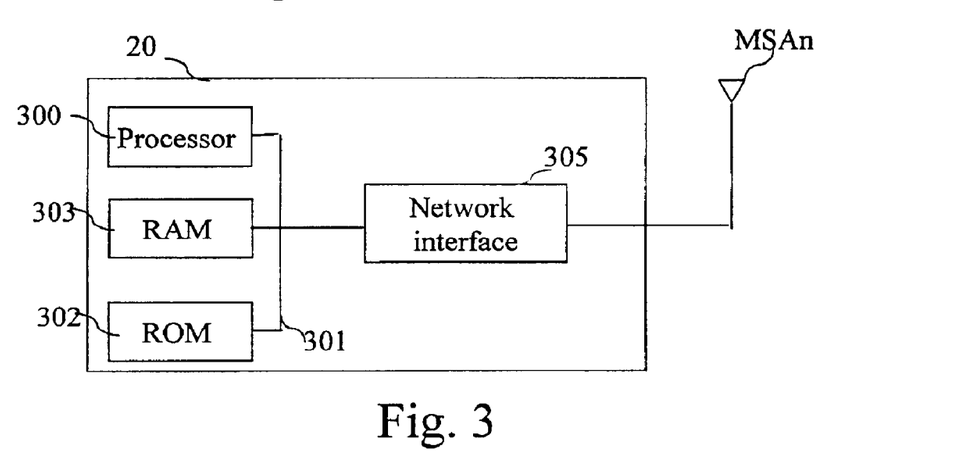
FIG. 3 is a diagram representing the architecture of a user equipment.

FIG. 3 is a diagram representing the architecture of a user equipment.

The user equipment 20, has, for example, an architecture based on components connected together by a bus 301 and a processor 300 controlled by programs as disclosed in the FIGS. 8 and 9.

It has to be noted here that the user equipment 20 is, in a variant, implemented into one or several dedicated integrated circuits which execute the same operations as the one executed by the processor 300 as disclosed hereinafter.

The bus 301 links the processor 300 to a read only memory ROM 302, a random access memory RAM 303 and a network interface 305.

The read only memory ROM 302 contains instructions of the programs related to the algorithms as disclosed in the FIGS. 8 and 9 which are transferred, when the user equipment 20 is powered on to the random access memory RAM 303.

The RAM memory 303 contains registers intended to receive variables, and the instructions of the programs related to the algorithms as disclosed in the FIGS. 8 and 9.

Figure 4:
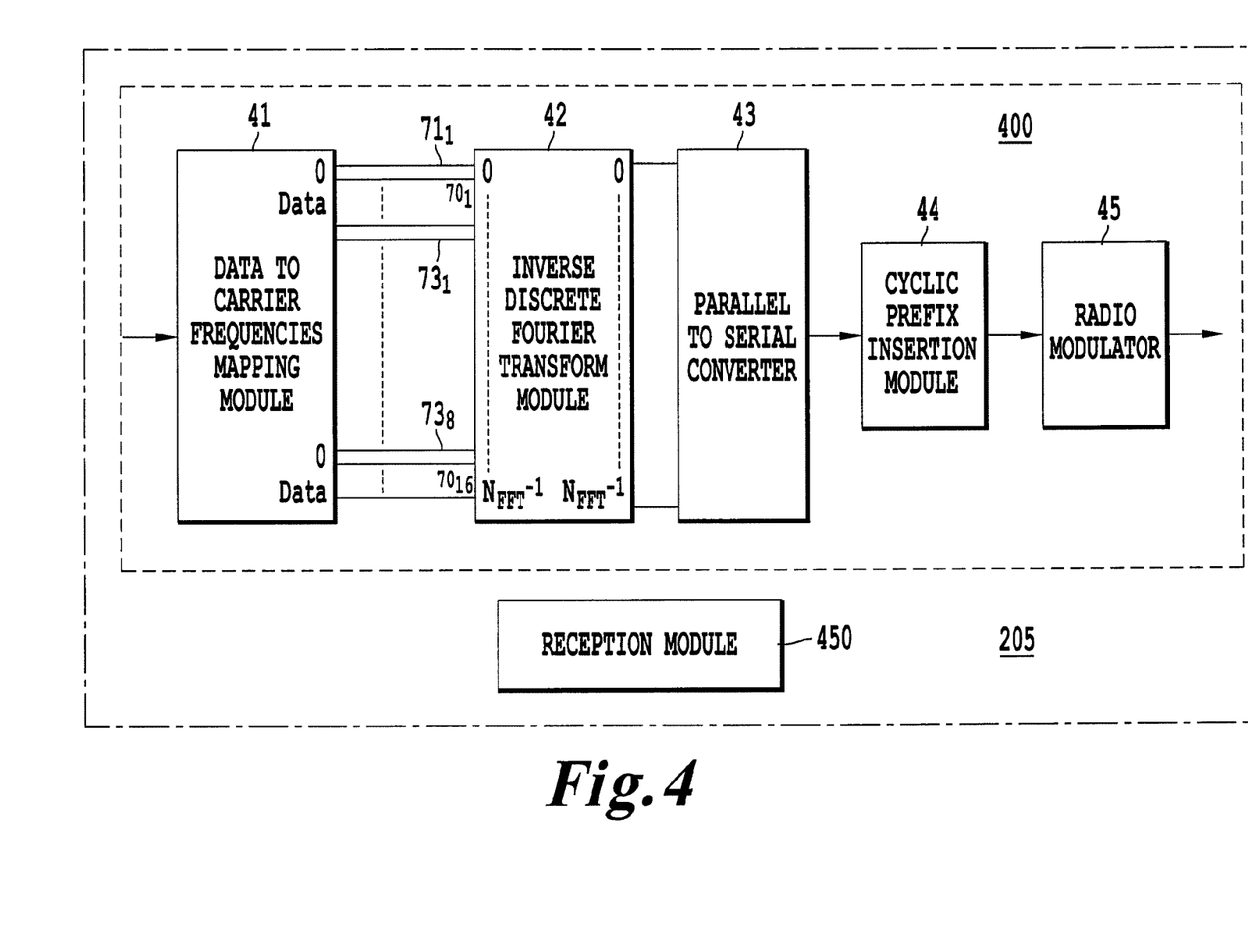
FIG. 4 is a diagram representing the architecture of the network interface of the base station.

FIG. 4 is a diagram representing the architecture of the network interface of the base station.

The network interface 205 of the base station 10 comprises a transmission module 400 and a reception module 450.

The architecture of the reception module 450 is similar to the architecture of the reception module 500 which will be disclosed hereinafter in reference to the FIG. 5.

The transmission module 400 comprises a data to carrier frequencies mapping module 41 which maps the data to be transferred on first carrier frequencies of at least two groups of first carrier frequencies.

As example and in a non limitative way, the data to carrier frequencies mapping module 41 maps data to the first carrier frequencies of sixteen groups 70. Only the group noted $70_1$ and the sixteenth group noted $70_{16}$ are shown in the FIG. 4 for the sake of clarity.

Each group of first carrier frequencies is spaced from at least one other group of first carrier frequencies by at least one second carrier frequency.

A second carrier frequency is a carrier frequency on which no data are mapped or is a carrier frequency used for transferring information like pilot symbols or other data than the one mapped on the first carrier frequencies.

The other data are, as example used, for signalling purpose, or data which need to be transferred at a lower rate than the data mapped on the first carrier frequencies or data which are not essential for the user equipment 20 which receives them or data which are transferred simultaneously on at least two second carrier frequencies.

As example, the FIG. 4 shows that the data to carrier frequencies mapping module 41 maps null values on second carrier frequencies.

Only three second carrier frequencies noted $71_1$, $73_1$ and $73_8$ are shown in the FIG. 4 for the sake of clarity but the data to carrier frequencies mapping module 41 maps null values or pilot symbols or signalling data or other data on a more important number of second carrier frequencies as it will be disclosed hereinafter in reference to the FIG. 7.

The data to carrier frequencies mapping module 41 maps the data to be transferred under the form of first symbols of a first duration and second symbols of a second duration. The data to carrier frequencies mapping module 41 maps the first symbols on first carrier frequencies of groups of carrier frequencies and maps the second symbols on first carrier frequencies of groups of first carrier frequencies.

In the telecommunication network 15, two different symbols are used either in the uplink or the downlink channel. The first symbols are as example long symbols and the second symbols are as example short symbols.

If a long symbol of duration $T_S$ is built from Nb carrier frequencies spaced by a sub frequency band $\Delta f$, a short symbol of duration $T_S/L$ is built by considering Nb/L carrier frequencies spaced by $L\Delta f$ if the same sampling frequency is used for the long and short symbols and where Nb is an integer and L>1.

When an OFDM modulation is used, the long symbol is obtained with a Inverse Discrete Fourier Transform (IDFT) of size Nb and the short symbol with an IDFT of size Nb/L where Nb/L is an integer value.

Preferably, the IDFT is an Inverse Fast Fourier Transform (IFFT).

L is equal to the duration of the first symbol divided by the duration of the second symbol. L is not necessarily an integer value, i.e. the first carrier frequencies on which a second symbol is mapped are not necessarily spaced by an integer number of $\Delta f$.

If L is an integer value, the first carrier frequencies on which the second symbols are mapped is a subset of the first carrier frequencies on which the first symbols are mapped.

If L is not an integer value, at least a part of the first carrier frequencies on which the second symbols are mapped are different from the first carrier frequencies on which the first symbols are mapped.

Short symbols are, as example and in a non limitative way, used to carry pilot symbols used for channel estimation.

According to the invention, the number $X_L$ of first carrier frequencies on which first symbols are mapped in one group of first carrier frequencies and the number $X_S$ of first carrier frequencies on which second symbols are mapped in that group of first carrier frequencies satisfy the following formula $(X_L+1)=(X_S+1)L$.

Furthermore, each first carrier frequency on which the second symbols are mapped is spaced from the second carrier frequencies by an integer number of $L\Delta f$. Each first carrier frequency on which the first symbols are mapped is spaced from the second carrier frequencies by an integer number of $\Delta f$.

The transmission module 400 comprises an Inverse Discrete Fourier Transform module 42 which executes preferably an IFFT of carrier frequencies in order to form IFFT samples.

The size $N_{FFT}$ of the IFFT is determined by the bandwidth of the base station 10.

The transmission module 400 comprises a parallel to serial converter 43 which serializes the IFFT samples.

The transmission module 400 comprises a cyclic prefix insertion module 44 and a radio modulator 45 which modulates the IFFT samples and the cyclic prefix by the modulation carrier frequency of the base station 10.

The radio modulator 45 is preferably an analog Radio Frequency modulator.

Figure 5:
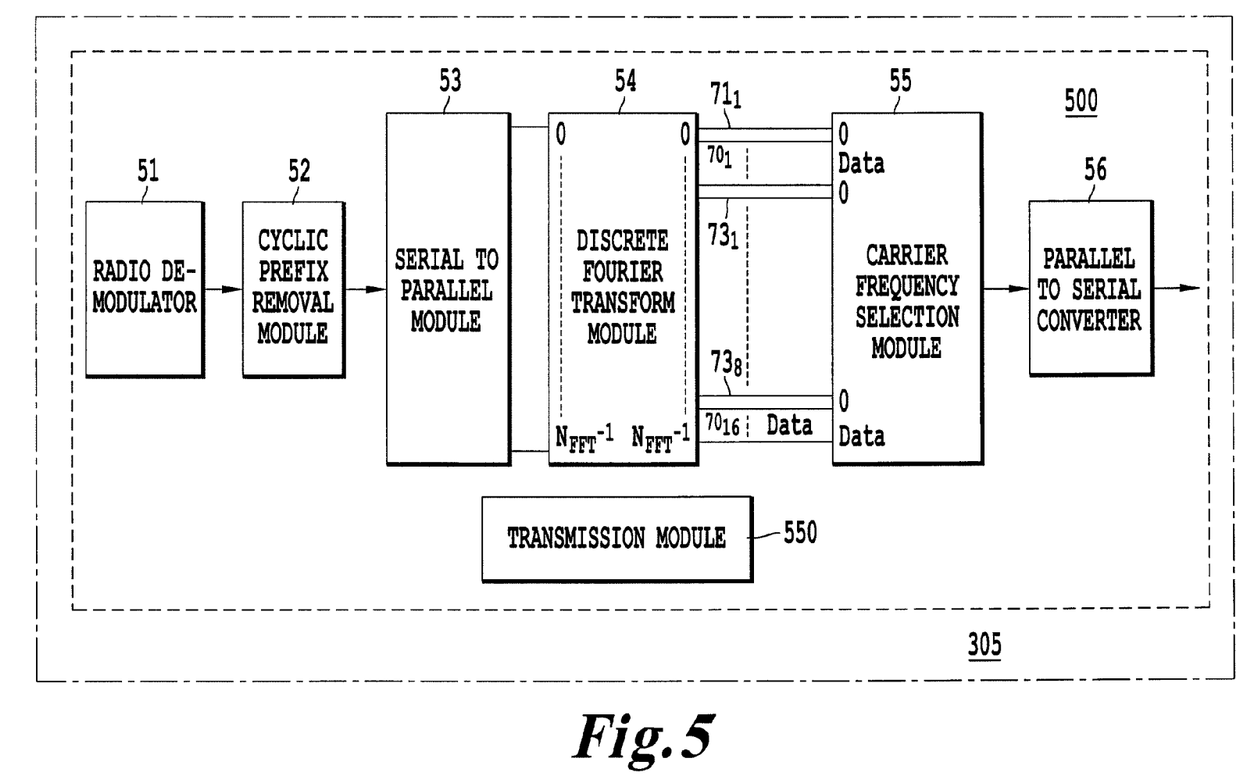
FIG. 5 is a diagram representing the architecture of the network interface of the user equipment.

FIG. 5 is a diagram representing the architecture of the network interface of the user equipment.

The network interface 305 of each user equipment 20 comprises a reception module 500 and a transmission module 550.

The architecture of the transmission module 550 is similar to the architecture of the transmission module 400 which has been already disclosed in reference to the FIG. 4.

The reception module 500 comprises a demodulator 51 which demodulates the received symbols by the demodulation carrier frequency of the user equipment 20.

The radio demodulator 51 is preferably an analog Radio Frequency demodulator.

By demodulating the received symbols by the carrier frequency which is the demodulation carrier frequency of the user equipment 20, the data, if there are some which have been mapped on that carrier frequency, may be corrupted by continuous components depending on the user equipment architecture.

The reception module 500 comprises a cyclic prefix removal module 52 which removes the cyclic prefix from the demodulated symbols.

The reception module 500 comprises a serial to parallel module 53 which converts in parallel the samples of the demodulated symbols of which the cyclic prefix has been removed.

The reception module 500 comprises a Discrete Fourier Transform module 54 which transforms the parallelised samples into the frequency domain.

The Discrete Fourier Transform module 54 is preferably a Fast Fourier Transform module.

The reception module 500 comprises a carrier frequency selection module 55 which selects groups of first carrier frequencies in order to proceed to the decoding of the received data.

Figure 7:
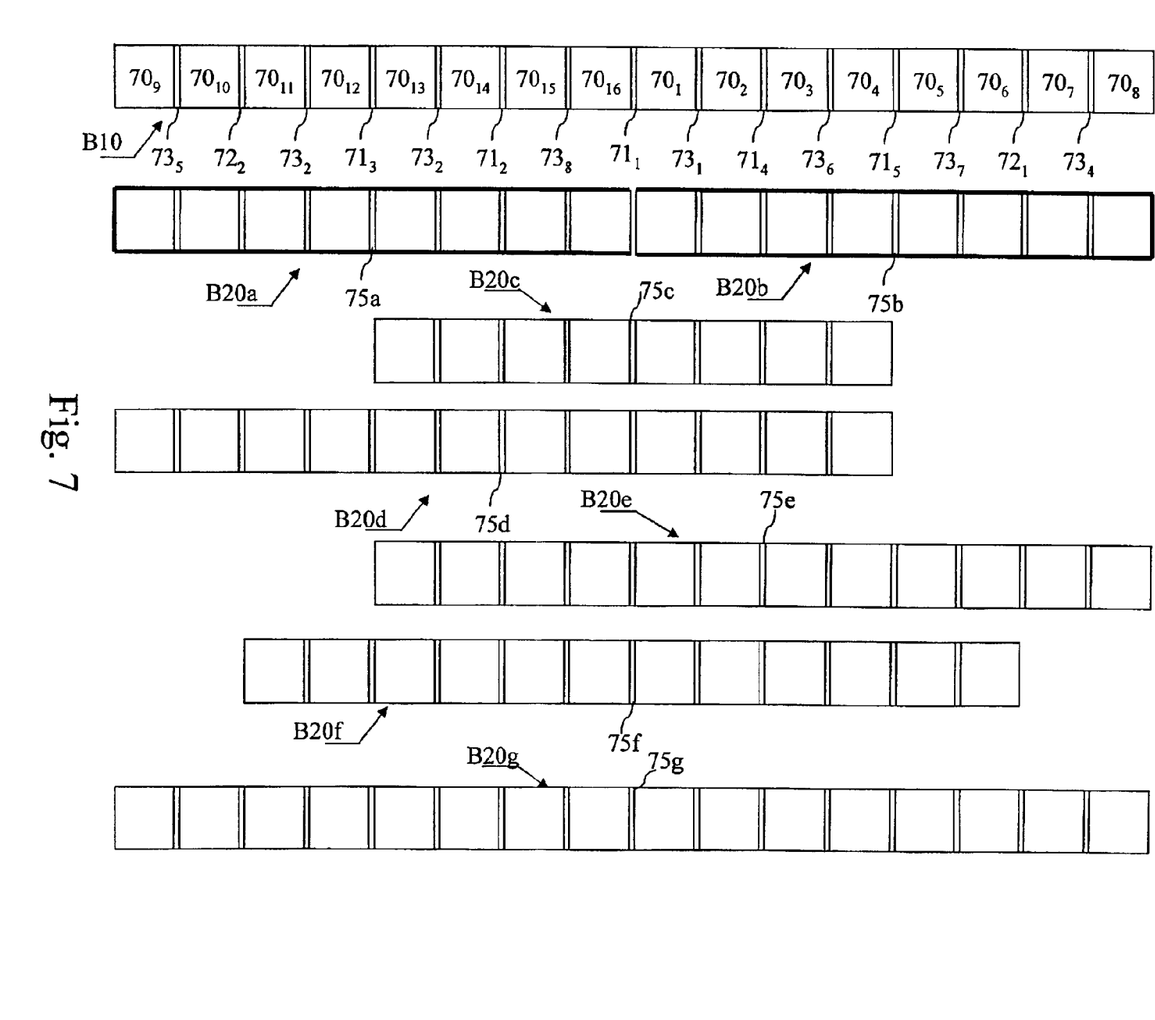
FIG. 7 is a diagram representing an example of the frequency band in which data are mapped on first carrier frequencies of groups of carrier frequencies and in which each group of first carrier frequencies are spaced from at least one other group of first carrier frequencies by at least one second carrier frequency.

As example and in a non limitative way, the carrier frequency selection module 55 selects the first carrier frequencies of sixteen groups of first carrier frequencies noted $70_1$ to $70_{16}$ in the FIG. 7. Only the group of first carrier frequencies noted $70_1$ and the sixteenth group of first carrier frequencies noted $70_{16}$ are shown in the FIG. 5 for the sake of clarity.

Each group of first carrier frequencies is spaced from at least one other group of first carrier frequencies by at least one second carrier frequency.

The carrier frequency selection module 55 assumes, as example, that null values are mapped on the second carrier frequencies. If the second carrier frequencies are used for transferring information like pilot symbols or other data than the one mapped on the first carrier frequencies, the carrier frequency selection module 55 assumes that the second carrier frequency which corresponds to the demodulation carrier frequency of the user equipment 20 carries on a null value and selects the other second carrier frequencies.

Only three second carrier frequencies noted $71_1$, $73_1$ and $73_8$ are shown in the FIG. 5 for the sake of clarity but the carrier frequency selection module 55 processes a more important number of second carrier frequencies.

The carrier frequency selection module 55 is able to process first symbols, as example long symbols, of a first duration and second symbols, as example short symbols, of a second duration which is equal to $1/L$ time the first duration. The carrier frequency selection module 55 selects the first carrier frequencies of groups of first carrier frequencies for the first symbols and selects first carrier frequencies of groups of first carrier frequencies for the second symbols.

The reception module 500 comprises a parallel to serial converter 56 which transforms the data conveyed by the first carrier frequencies in a serial form and if the second carrier frequencies are used for transferring information like pilot symbols or other data than the one mapped on the first carrier frequencies, the parallel to serial converter 56 transforms the data conveyed by the second carrier frequencies in a serial form.

Figure 6A:
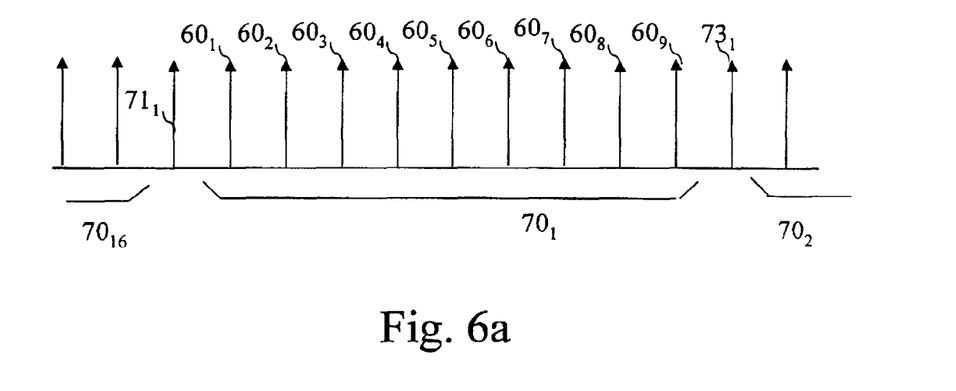
FIG. 6a is a diagram representing a first example of first carrier frequencies on which first and second symbols are mapped and second carrier frequencies.

FIG. 6a is a diagram representing a first example of first carrier frequencies on which first and second symbols are mapped and second carrier frequencies.

In the FIG. 6a, the group of first carrier frequencies $70_1$ is spaced from the group of first carrier frequencies $70_{16}$ by the second carrier frequency $71_1$. The group of first carrier frequencies $70_1$ is also spaced from the group of first carrier frequencies $70_2$ by the second carrier frequency $73_1$.

The group of first carrier frequencies $70_1$ comprises nine first carrier frequencies noted $60_1$ to $60_9$. The first carrier frequencies $60_1$ to $60_9$ are equally spaced from each other by $\Delta f$.

The first carrier frequencies $60_1$ to $60_9$ are the first carrier frequencies on which the first symbols are mapped in the group of first carrier frequencies $70_1$. Each first carrier frequency $60_1$ to $60_9$ is spaced from the second carrier frequencies $71_1$ and $73_1$ by an integer number of $\Delta f$.

As example, the first carrier frequencies $60_1$ is spaced from the second carrier frequency $71_1$ by one $\Delta f$ and is spaced from the second carrier frequency $73_1$ by nine $\Delta f$.

According to that first example, the first symbols are twice longer than the second symbols, i.e. $L=2$.

The first carrier frequencies $60_2$, $60_4$, $60_6$ and $60_8$ are the first carrier frequencies on which the second symbols are mapped in the group of first carrier frequencies $70_1$. The first carrier frequencies $60_2$, $60_4$, $60_6$ and $60_8$ are equally spaced from each other by $L\Delta f$.

Each first carrier frequency $60_2$, $60_4$, $60_6$ and $60_8$ is spaced from the second carrier frequencies $71_1$ and $73_1$ by an integer number of $L\Delta f$.

As example, the first carrier frequency $60_2$ is spaced from the second carrier frequency $71_1$ by one $L\Delta f$ and is spaced from the second carrier frequency $73_1$ by four $L\Delta f$.

As $L$ is an integer value, the first carrier frequencies on which the second symbols are mapped belong to a subset of the first carrier frequencies on which the first symbols are mapped.

The number $X_L$ of first carrier frequencies on which first symbols are mapped in the group of first carrier frequencies $70_1$ and the number $X_S$ of first carrier frequencies on which second symbols are mapped in the group of first carrier frequencies $70_1$ satisfy the formula $(X_L+1)=(X_S+1)L$.

Figure 6B:
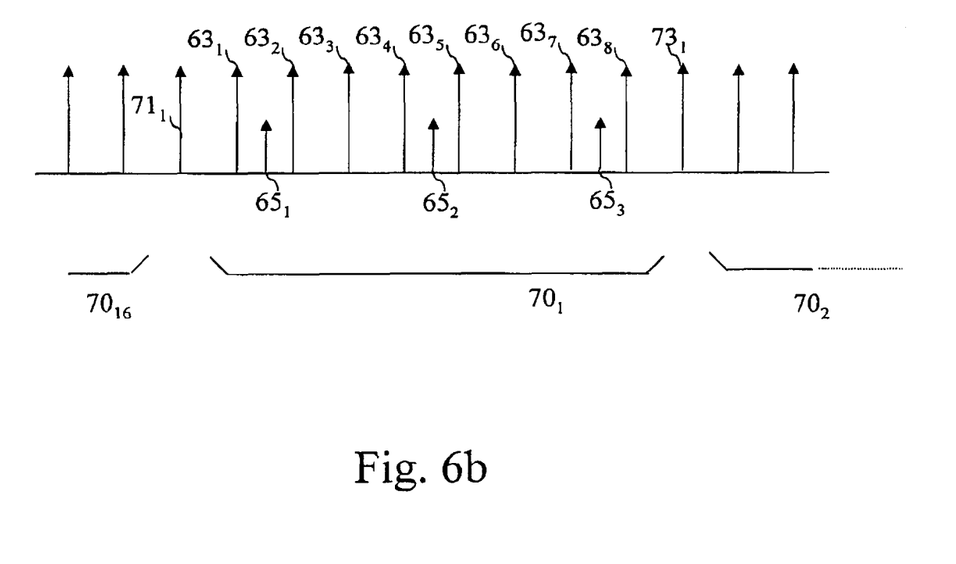
FIG. 6b is a diagram representing a second example of first carrier frequencies on which first and second symbols are mapped and second carrier frequencies.

FIG. 6b is a diagram representing a second example of first carrier frequencies on which first and second symbols are mapped and second carrier frequencies.

In the FIG. 6b, the group of first carrier frequencies $70_1$ is spaced from the group of first carrier frequencies $70_{16}$ by the second carrier frequency $71_1$. The group of first carrier frequencies $70_1$ is also spaced from the group of first carrier frequencies $70_2$ by the second carrier frequency $73_1$.

The group of first carrier frequencies $70_1$ comprises eight first carriers frequencies noted $63_1$ to $63_8$ and three first carriers frequencies noted $65_1$ to $65_3$. The first carrier frequencies $63_1$ to $63_8$ are equally spaced from each other by $\Delta f$.

The first carrier frequencies $63_1$ to $63_8$ are the first carrier frequencies on which the first symbols are mapped in the group of first carrier frequencies $70_1$. Each first carrier frequency $63_1$ to $63_8$ is spaced from the second carrier frequencies $71_1$ and $73_1$ by an integer number of $\Delta f$.

As example, the first carrier frequencies $63_1$ is spaced from the second carrier frequency $71_1$ by one $\Delta f$ and is spaced from the second carrier frequency $73_1$ by eight $\Delta f$.

According to that second example, the first symbols are one and half time longer than the second symbols, i.e. L=1.5.

The first carrier frequencies $65_1$, $63_3$, $65_2$, $63_6$ and $65_3$ are the first carrier frequencies on which the second symbols are mapped in the group of first carrier frequencies $70_1$. The first carrier frequencies $65_1$, $63_3$, $65_2$, $63_6$ and $65_3$ are equally spaced from each other by $L\Delta f$.

Each first carrier frequencies $65_1$, $63_3$, $65_2$, $63_6$ and $65_3$ is spaced from the second carrier frequencies $71_1$ and $73_1$ by an integer number of $L\Delta f$.

As example, the first carrier frequencies $65_1$ is spaced from the second carrier frequency $71_1$ by one $L\Delta f$ and is spaced from the second carrier frequency $73_1$ by five $L\Delta f$.

As L is not an integer value, at least a part of the first carrier frequencies on which the second symbols are mapped are different from the first carrier frequencies on which the first symbols are mapped.

The number $X_L$ of first carrier frequencies on which first symbols are mapped in the group of first carrier frequencies $70_1$ and the number $X_S$ of first carrier frequencies on which second symbols are mapped in the group of first carrier frequencies $70_1$ satisfy the formula $(X_L+1)=(X_S+1)L$.

FIG. 7 is a diagram representing an example of the frequency band in which data are mapped on first carrier frequencies of groups of carrier frequencies and in which each group of first carrier frequencies are spaced from at least one other group of first carrier frequencies by at least one second carrier frequency.

In the example of the FIG. 7, the telecommunication network 15 uses Time Division Duplexing scheme and the frequency band is divided into 1215 carrier frequencies which are used either for the downlink or the uplink channels.

In the FIG. 7, the frequency band used by the base station 10 is noted B10. That frequency band has, as example, a bandwidth of 20 MHz which corresponds to 1215 carrier frequencies.

The frequency bands used by the user equipments 20a to 20g are respectively noted B20a to B20g. The frequency bands B20a, B20b and B20c have, as example, a bandwidth of 10 MHz which corresponds to 607 carrier frequencies. The frequency bands B20d, B20e and B20f have, as example, a bandwidth of 15 MHz which corresponds to 911 carrier frequencies. The frequency band B20g has a bandwidth of 20 MHz.

The modulation and the demodulation carrier frequency of the base station 10 is the carrier frequency $71_1$.

The modulation and the demodulation carrier frequency of the user equipment 20a is the carrier frequency 75a, the modulation and the demodulation carrier frequency of the user equipment 20b is the carrier frequency 75b, the modulation and the demodulation carrier frequency of the user equipment 20c is the carrier frequency 75c, the modulation and the demodulation carrier frequency of the user equipment 20d is the carrier frequency 75d, the modulation and the demodulation carrier frequency of the user equipment 20e is the carrier frequency 75e, the modulation and the demodulation carrier frequency of the user equipment 20f is the carrier frequency 75f and the modulation and the demodulation carrier frequency of the user equipment 20g is the carrier frequency 75g.

As we can understand in the example of the FIG. 7, the base station 10 and the user equipments 20 may have different modulation and/or demodulation carrier frequencies 75.

As the frequency band B10 of the base station 10 is greater or equal to the frequency bands B20 of the user equipments 20 and as the user equipments 20 have different modulation and/or demodulation carrier frequencies 75, the frequency band B10 of the base station 10 is used more efficiently.

According to the invention, first and second carrier frequencies are defined.

In the example of the FIG. 7, the first carrier frequencies are grouped into 16 groups of first carrier frequencies noted respectively $70_1$ to $70_{16}$.

As example, each group 70 comprises $X_L=75$ first carrier frequencies on which first symbols are mapped and $X_S=37$ first carrier frequencies on which second symbols are mapped.

Preferably and in a non limitative way, each group is divided into three resource blocks of first carrier frequencies on which first symbols are mapped. The resource blocks comprise almost the same number of first carrier frequencies or the same number of first carrier frequencies.

The second carrier frequencies are noted 71, 72, and 73 in the FIG. 7.

The second carrier frequency $71_1$ is the modulation and/or demodulation carrier frequency of the base station 10 and corresponds to the modulation and/or demodulation carrier frequencies 75c, 75f and 75g of the user equipments 20c, 20f and 20g. The second carrier frequency $71_2$ corresponds to the modulation and/or demodulation carrier frequency 75d of the user equipment 20d. The second carrier frequency $71_3$ corresponds to the modulation and/or demodulation carrier frequency 75a of the user equipment 20a. The second carrier frequency $71_4$ corresponds to the modulation and/or demodulation carrier frequency 75e of the user equipment 20e and the second carrier frequency $71_5$ corresponds to the modulation and/or demodulation carrier frequency 75b of the user equipment 20b.

According to the invention, the second carrier frequencies $71_1$, $71_3$ and $71_5$ are susceptible to be the modulation and/or demodulation carrier frequency of the user equipments 20 which have a given frequency band. As example such frequency band is equal to 10 MHz. The second carrier frequencies $71_1$, $71_4$ and $71_2$ are susceptible to be the modulation and/or demodulation carrier frequency of the user equipments 20 which have another given frequency band. As example, such frequency band is equal to 15 MHz.

The second carrier frequencies $72_1$ and $72_2$ are defined in order to maintain a regular spacing structure of the second carrier frequencies.

The second carrier frequencies $73_1$ to $73_9$ are defined in order to insure that in each group of first carrier frequencies, the member $X_L$ of first carrier frequencies on which first symbols are mapped in one group of first carrier frequencies 70 and the number $X_S$ of first carrier frequencies on which second symbols are mapped in that group of first carrier frequencies 70 satisfy the formula $(X_L+1)=(X_S+1)L$.

According to the invention, when the base station 10 transfers data to a user equipment 20, it maps first and second symbols on first carrier frequencies of groups of first carrier frequencies 70 comprised in the frequency band B20 of the user equipment 20. Each of these groups of first carrier frequencies 70 is spaced from at least one other group of first carrier frequencies 70 by a second carrier frequency 71 and/or 72 and/or 73.

As example, when the base station 10 transfers data to the user equipment 20a, it maps data on first carrier frequencies of the groups of first carrier frequencies $70_9$ to $70_{16}$ as they are comprised in the frequency band B20a of the user equipment 20a.

The base station 10 maps data on each first carrier frequency of each group of first carrier frequencies $70_9$ to $70_{16}$ or maps data on each first carrier frequency of at least one group of first carrier frequencies $70_9$ to $70_{16}$ or maps data on some first carrier frequencies of each group of first carrier frequencies $70_9$ to $70_{16}$ or maps data on some first carrier frequencies of at least one group of first carrier frequencies.

In a similar way, when a user equipment 20 transfers data to the base station 10, it maps first and second symbols on first carrier frequencies of groups of first carrier frequencies 70 comprised in the frequency band B20 of the user equipment 20. Each of these group of first carrier frequencies 70 is spaced from at least one other group of first carrier frequencies 70 by a second carrier frequency 71 and/or 72 and/or 73.

As example, when the user equipment 20a transfers data to the base station 10, it maps data on first carrier frequencies of the groups of first carrier frequencies $70_9$ to $70_{16}$.

The user equipment 20a maps data on each first carrier frequency of each group of first carrier frequencies $70_9$ to $70_{16}$ or maps data on each first carrier frequency of at least one group of first carrier frequencies $70_9$ to $70_{16}$ or maps data on some first carrier frequencies of each group of first carrier frequencies $70_9$ to $70_{16}$ or maps data on some first carrier frequencies of at least one group of first carrier frequencies.

It has to be noted here that the first carrier frequencies on which the base station 10 maps data when it transfers data to the user equipment 20a may be different from the first carrier frequencies on which the user equipment 20a maps data when it transfers data to the base station 10.

It has to be noted here that, the user equipments 20 may transfer data under the form of first and/or second symbols and the base station 10 may transfer data only under the form of first symbols. On the opposite, the user equipments 20 may transfer data only under the form of first symbols and the base station 10 may transfer data under the form of first and/or second symbols.

The second carrier frequencies 71, 72 and 73 are the same either for the downlink channel or the uplink channel.

Such regular structure of the first and second carrier frequencies simplifies the complexity of the base station 10 and the user equipments.

FIG. 8 is a diagram representing an algorithm for transferring data according to the present invention.

The present algorithm is executed by the base station 10 and/or each user equipment 20. The present algorithm is disclosed, as example, when it is executed by the base station 10.

At step S800, the processor 200 of the base station 10 gets the identifiers of the second carrier frequencies 71, 72 and 73 stored in the RAM memory 203 of the base station 10.

The identifiers of the second carrier frequencies are predefined.

At next step S801, the processor 200 gets the identifiers of the first carrier frequencies comprised in each group of first carrier frequencies 70.

At next step S802, the processor transfers the identifiers obtained at step S800 and S801 to the network interface 205 and more precisely to the data to carrier frequencies mapping module 41 of the transmission module 400.

The data to carrier frequencies mapping module 41 maps the data to be transferred on first carrier frequencies of at least two groups of first carrier frequencies.

Each group of first carrier frequencies is spaced from at least one other group of first carrier frequencies by at least one second carrier frequency.

At next step S803, the processor 200 commands the process of the second carrier frequencies to the network interface 205 and more precisely to the data to carrier frequencies mapping module 41 of the transmission module 400.

The data to carrier frequencies mapping module 41 set null values on the second carrier frequencies or maps pilot symbols on the second carrier frequencies or maps other data than the one mapped on the first carrier frequencies.

At next step S804, the mapped data are transferred to at least a user equipment 20.

For each data having to be transferred, the steps S802 to S804 are executed.

FIG. 9 is a diagram representing an algorithm for retrieving data according to the present invention.

The present algorithm is executed by the base station 10 and/or each user equipment 20. The present algorithm is disclosed, as example, when it is executed by a user equipment 20.

At step S900, the processor 300 of the user equipment 20 gets the identifiers of the second carrier frequencies 71, 72 and 73 stored in the RAM memory 303 of the user equipment 20.

The identifiers of the second carrier frequencies are predefined.

At next step S901, the processor 300 gets the identifiers of the first carrier frequencies comprised in each group of first carrier frequencies 70.

At next step S902, the processor 300 commands the process of the second carrier frequencies to the network interface 305 and more precisely to the carrier frequency selection module 55 of the reception module 500.

If no data are mapped on the second carrier frequencies, the carrier frequency selection module 55 doesn't process the second carrier frequencies. If the second carrier frequencies are used for transferring information like pilot symbols or other data than the one mapped on the first carrier frequencies, the carrier frequency selection module 55 doesn't process only the second carrier frequency which corresponds to the demodulation carrier frequency of the user equipment 20 and selects the other second carrier frequencies.

At next step S903, the processor 300 transfers the identifiers obtained at step S901 to the network interface 305 and more precisely to the carrier frequency selection module 55 of the reception module 500.

The carrier frequency selection module 55 selects groups of first carrier frequencies in order to proceed to the decoding of the received data.

Each group of first carrier frequencies is spaced from at least one other group of first carrier frequencies by at least one second carrier frequency.

At next step S904, the data are retrieved by the processor 300.

Each time signals are received, the steps S902 to S904 are executed.

Naturally, many modifications can be made to the embodiments of the invention described above without departing from the scope of the present invention.

The invention claimed is:

1. A method for transferring, by a first telecommunication device, data to a second telecommunication device through a telecommunication network using multiple carrier frequencies, the method being executed by the first telecommunication device and comprising:
   mapping the data on carrier frequencies of a plurality of consecutive groups of the carrier frequencies, a first group of the carrier frequencies being separated from a second group of the carrier frequencies by an intervening second carrier frequency of a plurality of second carrier frequencies, at least two second carrier frequencies being carrier frequencies susceptible to being a demodulation carrier frequency of the second telecommunication device; and
   transferring the mapped data to the second telecommunication device.

2. The method according to claim 1, wherein each second carrier frequency susceptible to being the demodulation carrier frequency of the second telecommunication device is a predetermined carrier frequency.

3. The method according to any of the claims 1 or 2, wherein each group of the carrier frequencies includes a same predetermined number of the carrier frequencies.

4. The method according to claim 3, wherein the data is transferred under a form of first symbols of a first duration and second symbols of a second duration, the first symbols being mapped on a first number of the carrier frequencies, the second symbols being mapped on a second number of the carrier frequencies.

5. The method according to claim 4, wherein each carrier frequency on which a first symbol is mapped is spaced from the second carrier frequencies by an integer number of $\Delta f$, where $\Delta f$ is a spacing between two carrier frequencies on which the first symbol is mapped.

6. The method according to claim 5, wherein each carrier frequency on which a second symbol is mapped is spaced from the second carrier frequencies by an integer number of $L\Delta f$, where L is the first duration divided by the second duration.

7. The method according to claim 6, wherein a number $X_L$ of the carrier frequencies on which the first symbols are mapped in one group of the carrier frequencies and a number $X_S$ of the carrier frequencies on which the second symbols are mapped in the one group of the carrier frequencies satisfy a following formula $(X_L+1)=(X_S+1)L$.

8. The method according to claim 6, wherein L is an integer value, and the carrier frequencies on which the second symbols are mapped belong to a subset of the carrier frequencies on which the first symbols are mapped.

9. The method according to claim 5, wherein at least one other second carrier frequency is a predetermined carrier frequency defined in order to insure that in each group of the carrier frequencies, a number $X_L$ of the carrier frequencies on which the first symbols are mapped in one group of the carrier frequencies and the number $X_S$ of the carrier frequencies on which the second symbols are mapped in the one group of the carrier frequencies satisfy the formula $(X_L+1)=(X_S+1)L$.

10. The method according to claim 5, wherein
    the first telecommunication device transfers the data through a first frequency band and the second telecommunication device receives the data through a second frequency band, and
    a bandwidth of the second frequency band is smaller than a bandwidth of the first frequency band.

11. The method according to claim 10, wherein
    the first telecommunication device transfers the data to a plurality of second telecommunication devices, and
    at least one second carrier frequency is susceptible to being the demodulation carrier frequency of another second telecommunication device.

12. The method according to claim 5, wherein
    the first telecommunication device transfers the data through a first frequency band and the second telecommunication device receives the data through a second frequency band, and
    a bandwidth of the first frequency band is smaller than a bandwidth of the second frequency band.

13. The method according to claim 12, wherein one second carrier frequency is a modulation carrier frequency of the first telecommunication device.

14. The method according to claim 13, wherein at least one other second carrier frequency is susceptible to being the modulation carrier frequency of another first telecommunication device.

15. The method according to claim 1, further comprising:
    mapping on the second carrier frequencies a null value, pilot symbols or data other than the data mapped on the carrier frequencies.

16. A method for retrieving data transferred by a first telecommunication device to a second telecommunication device through a telecommunication network using multiple carrier frequencies, the method being executed by the second telecommunication device and comprising:
    selecting carrier frequencies of a plurality of consecutive groups of the carrier frequencies, a first group of the carrier frequencies being separated from a second group of the carrier frequencies by an intervening second carrier frequency of a plurality of second carrier frequencies, at least two second carrier frequencies being carrier frequencies susceptible to being a demodulation carrier frequency of the second telecommunication device; and
    retrieving the data on the selected carrier frequencies.

17. The method according to claim 16, wherein each group of the carrier frequencies includes a same predetermined number of the carrier frequencies.

18. The method according to claim 17, wherein the data is transferred under a form of first symbols of a first duration and second symbols of a second duration, the first symbols being mapped on a first number of the carrier frequencies, the second symbols being mapped on a second number of the carrier frequencies.

19. The method according to claim 18, wherein each carrier frequency on which a first symbol is mapped is spaced from the second carrier frequencies by an integer number of $\Delta f$, where $\Delta f$ is a spacing between two carrier frequencies on which the first symbol is mapped.

20. The method according to claim 19, wherein each carrier frequency on which a second symbol is mapped is spaced from the second carrier frequencies by an integer number of L$\Delta$f, where L is the first duration divided by the second duration.

21. The method according to claim 20, wherein a number $X_L$ of the carrier frequencies on which the first symbols are mapped in one group of the carrier frequencies and a number $X_S$ of the carrier frequencies on which the second symbols are mapped in the one group of the carrier frequencies satisfy a following formula $(X_L+1)=(X_S+1)L$, wherein L is the first duration divided by the second duration.

22. The method according to claim 19, wherein at least one other second carrier frequency is
   a predetermined carrier frequency defined in order to insure that in each group of the carrier frequencies, a number $X_L$ of the carrier frequencies on which the first symbols are mapped in one group of the carrier frequencies and a number $X_S$ of the carrier frequencies on which the second symbols are mapped in the one group of the carrier frequencies satisfy the formula $(X_L+1)=(X_S+1)L$,
   the predetermined carrier frequency susceptible to being a demodulation carrier frequency of another second telecommunication device, or
   the predetermined carrier frequency susceptible to being a modulation carrier frequency of another first telecommunication device.

23. The method according to claim 22, further comprising:
   selecting at least one second carrier frequency and/or at least one other second carrier frequency; and
   retrieving the data on the selected at least one second carrier frequency and/or the at least one other second carrier frequency.

24. The method according to claim 16, wherein
   the first telecommunication device transfers the data through a downlink channel and the second telecommunication device transfers the data through an uplink channel, and
   the uplink and downlink channels have same second carrier frequencies.

25. A device for transferring, from a first telecommunication device, data to a second telecommunication device, through a telecommunication network using multiple carrier frequencies, the device for transferring being included in the first telecommunication device and comprising:
   mapping means for mapping the data on carrier frequencies of a plurality of consecutive groups of the carrier frequencies, a first group of the carrier frequencies being separated from a second group of the carrier frequencies by an intervening second carrier frequency of a plurality of second carrier frequencies, at least two second carrier frequencies being carrier frequencies susceptible to being a demodulation carrier frequency of the second telecommunication device; and
   transferring means for transferring the mapped data to the second telecommunication device.

26. A device for retrieving data transferred by a first telecommunication device to a second telecommunication device through a telecommunication network using multiple carrier frequencies, the device for retrieving being included in the second telecommunication device and comprising:
   selecting means for selecting carrier frequencies of a plurality of consecutive groups of the carrier frequencies, a first group of the carrier frequencies being separated from a second group of the carrier frequencies by an intervening second carrier frequency of a plurality of second carrier frequencies, at least two second carrier frequencies being carrier frequencies susceptible to being a demodulation carrier frequency of the second telecommunication device; and
   retrieving means for retrieving the data on the selected carrier frequencies.

27. A non-transitory computer-readable medium storing computer-readable instructions executed by a processor of a first telecommunication device that cause the first telecommunication device to perform a method for transferring data to a second telecommunication device, the method comprising:
   mapping the data on carrier frequencies of a plurality of consecutive groups of the carrier frequencies, a first group of the carrier frequencies being separated from a second group of the carrier frequencies by an intervening second carrier frequency of a plurality of second carrier frequencies, at least two second carrier frequencies being carrier frequencies susceptible to being a demodulation carrier frequency of the second telecommunication device; and
   transferring the mapped data to the second telecommunication device.

28. A non-transitory computer-readable medium storing computer-readable instructions executed by a processor of a second telecommunication device that cause the second telecommunication device to perform a method for retrieving data transferred by a first telecommunication device, the method comprising:
   selecting carrier frequencies of a plurality of consecutive groups of the carrier frequencies, a first group of the carrier frequencies being separated from a second group of the carrier frequencies by an intervening second carrier frequency of a plurality of second carrier frequencies, at least two second carrier frequencies being carrier frequencies susceptible to being a demodulation carrier frequency of the second telecommunication device; and
   retrieving the data on the selected carrier frequencies.

* * * * *